(12) United States Patent
Berbari

(10) Patent No.: US 6,962,223 B2
(45) Date of Patent: Nov. 8, 2005

(54) FLYWHEEL-DRIVEN VEHICLE

(76) Inventor: George Edmond Berbari, 6400 Hair Rd., Disputana, VA (US) 23842

( * ) Notice: Subject to any disclaimer, the term of this patent is extended or adjusted under 35 U.S.C. 154(b) by 176 days.

(21) Appl. No.: 10/606,698

(22) Filed: Jun. 26, 2003

(65) Prior Publication Data

US 2004/0262062 A1 Dec. 30, 2004

(51) Int. Cl.$^7$ .............................................. B60K 1/00
(52) U.S. Cl. ...................................... 180/65; 180/65.2
(58) Field of Search ............................. 180/65.2, 65.3, 180/65.4, 65.6, 165; 701/22; 320/104

(56) References Cited

U.S. PATENT DOCUMENTS

| | | |
|---|---|---|
| 3,724,288 A | 4/1973 | Jakubowski |
| 3,858,674 A | 1/1975 | Tabor |
| 3,870,116 A | 3/1975 | Seliber |
| 3,878,913 A | 4/1975 | Lionts et al. |
| 3,882,950 A * | 5/1975 | Strohlein .................... 180/165 |
| 3,949,556 A | 4/1976 | Wallis |
| 4,065,702 A | 12/1977 | Locker et al. |
| 4,131,171 A | 12/1978 | Keyes |
| 4,208,921 A | 6/1980 | Keyes |
| 4,218,624 A | 8/1980 | Schiavone |
| 4,233,858 A * | 11/1980 | Rowlett .......................... 475/5 |
| 4,255,695 A | 3/1981 | Plunkett et al. |
| 4,393,964 A | 7/1983 | Kemper |
| 4,411,171 A * | 10/1983 | Fiala ............................. 475/5 |
| 4,423,794 A * | 1/1984 | Beck ........................... 180/165 |
| 4,597,463 A * | 7/1986 | Barnard ....................... 180/165 |
| 4,629,947 A | 12/1986 | Hammerslag et al. |
| 5,141,173 A | 8/1992 | Lay |
| 5,214,358 A * | 5/1993 | Marshall ....................... 318/139 |
| 5,228,291 A | 7/1993 | Meyering |
| 5,568,023 A | 10/1996 | Grayer et al. |
| 5,569,108 A | 10/1996 | Cadee et al. |
| 5,762,156 A | 6/1998 | Bates et al. |
| 5,765,656 A * | 6/1998 | Weaver ....................... 180/65.3 |
| 5,767,595 A | 6/1998 | Rosen |
| 5,880,544 A | 3/1999 | Ikeda et al. |
| 5,931,249 A | 8/1999 | Ellis et al. |
| 5,934,396 A * | 8/1999 | Kurita ......................... 180/65.2 |
| 6,069,424 A | 5/2000 | Colello et al. |
| 6,175,172 B1 | 1/2001 | Bakholdin et al. |
| 6,232,743 B1 * | 5/2001 | Nakanishi .................... 320/104 |
| 6,392,380 B2 * | 5/2002 | Furukawa et al. .......... 320/104 |
| 6,573,626 B1 * | 6/2003 | Gosebruch et al. ........... 310/74 |
| 6,615,118 B2 * | 9/2003 | Kumar ........................ 701/19 |

* cited by examiner

Primary Examiner—Christopher P. Ellis
Assistant Examiner—Kelly E. Campbell
(74) Attorney, Agent, or Firm—John H. Thomas, P.C.

(57) ABSTRACT

A flywheel-driven vehicle is powered by an electric motor. The rotation of the flywheel is initiated and maintained by an electric motor, wherein the electric motor is powered alternatively by a plurality of batteries (or sets of batteries). A charger assembly is connected to the plurality of batteries. In operation, one battery at a time powers the electric motor while, simultaneously, the other battery(s) is/are being recharged.

8 Claims, 5 Drawing Sheets

FLYWHEEL-DRIVEN VEHICLE

This invention relates to a vehicle powered by a flywheel. Specifically, it relates to a drive system for a vehicle having an electric motor that causes rotation of a flywheel, and the energy then stored in the flywheel is used to drive the vehicle.

BACKGROUND OF THE INVENTION

The need for energy efficient and clean-running vehicles has existed for many years. This urgency is constantly reenforced by higher fuel prices, dwindling fuel supplies, and reports of dire environmental effects of internal combustion engine exhaust. Much of the popular effort directed to solving these problems includes increasing the efficiency of internal combustion engines thereby resulting in cars with greater gas mileage.

One area of effort in seeking fuel efficient vehicles is in the hybrid type of cars. Generically speaking, these cars combine gas and electric motors. Those motors compliment each other to obtain efficiencies. In some of these types of cars, small flywheels are used to recharge the electric batteries that assist in the drive of the car. These flywheels are typically actuated only during the braking of the vehicle. The use of the flywheel is effectively for this recharging purpose only.

A still further type of technology used in connection with efficient and environmentally friendly cars is a flywheel-driven vehicle where the rotation of the flywheel is created by an electric motor and/or an internal combustion engine. In the alternative of an electric motor driving a flywheel, there is typically included a recharging feature that recharges the battery that drives the electric motor upon deceleration of the vehicle. Hypothetically, this may be seen to be very efficient. The difficulty is in the actual execution of the concept. One problem is the use of a single battery or energy source that must run the motor to rotate the flywheel and be recharged.

SUMMARY OF THE INVENTION

Accordingly, it is an object of the present invention to solve the foregoing problems and shortcomings in the prior art. In the present invention, a flywheel-driven system has two or more batteries (or sets of batteries) that alternately power the electric motor to rotate the flywheel. Only one battery (or set of batteries) powers the electric motor while the other(s) is/are recharged by the movement and inertia of the vehicle. The system may switch back and forth between batteries to power the electric motor.

In one embodiment, a vehicle having a flywheel drive system comprises a flywheel that is connected to a vehicle drive system and that provides energy to drive the vehicle. An electric motor is connected to and causes the rotation of the flywheel. The vehicle further comprises a charger assembly and two drive batteries, each electrically connectable to the electric motor and the charger assembly. When one of the drive batteries is electrically connected to the electric motor, the other drive battery is electrically connected to the charger assembly. The charger assembly comprises a charger, an inverter, a charger battery and an alternator, wherein the alternator is connected to the vehicle drive system. The alternator is electrically connected to and energizes the charger battery when the vehicle is in motion. The charger battery is electrically connected to and powers the inverter with the inverter electrically connected to and powering the charger. The charger is electrically connected to and recharges the drive battery that is not connected to the electric motor. The vehicle may further comprise a switch electrically connected to the electric motor, charger assembly and drive batteries. The switch is adapted to change electrical connections from a first state where first drive battery and electric motor are connected and second drive battery and charger assembly are connected to a second state where first drive battery and charger assembly are connected and second drive battery and electric motor are connected. The switch may be manual or it may comprise a voltmeter wherein the switch automatically changes, electrical connections based upon predetermined voltmeter readings. Each drive battery may be a set of a plurality of batteries connected together in series. The weight of the flywheel is in the range of about 5% to about 10% of the weight of the vehicle. The charger may be a cell-type charger. The flywheel may be connected to the vehicle drive system through a set of variable speed sheaves.

DETAILED DESCRIPTION OF THE INVENTION

The present invention is directed to the specific field of flywheel-driven vehicles. That is, a flywheel is linked to and is the energy source for the rotation of the drive system. (drive shaft) of a vehicle. The rotation of the flywheel is initiated and maintained by an electric motor, wherein the electric motor is powered alternatively by a plurality of batteries (or sets of batteries). A charger assembly is also connected to the plurality of batteries. In operation, one battery at a time powers the electric motor while, simultaneously, the other battery(s) is/are being recharged. A switch operates to deliver electricity to the electric motor from alternative batteries, while making sure that the flow of recharge energy is directed to each battery that is not powering the electric motor at that time.

The following description is generally in the context of a working prototype of the claimed invention. Inevitably, there will be refinements and variations made on the present prototype as well as with similar vehicles built on the fundamental teachings herein. A key to the operation of the overall system is the use of at least two batteries to power the electric motor so that effectively constant recharging is accomplished while the vehicle is moving.

Figure 1:
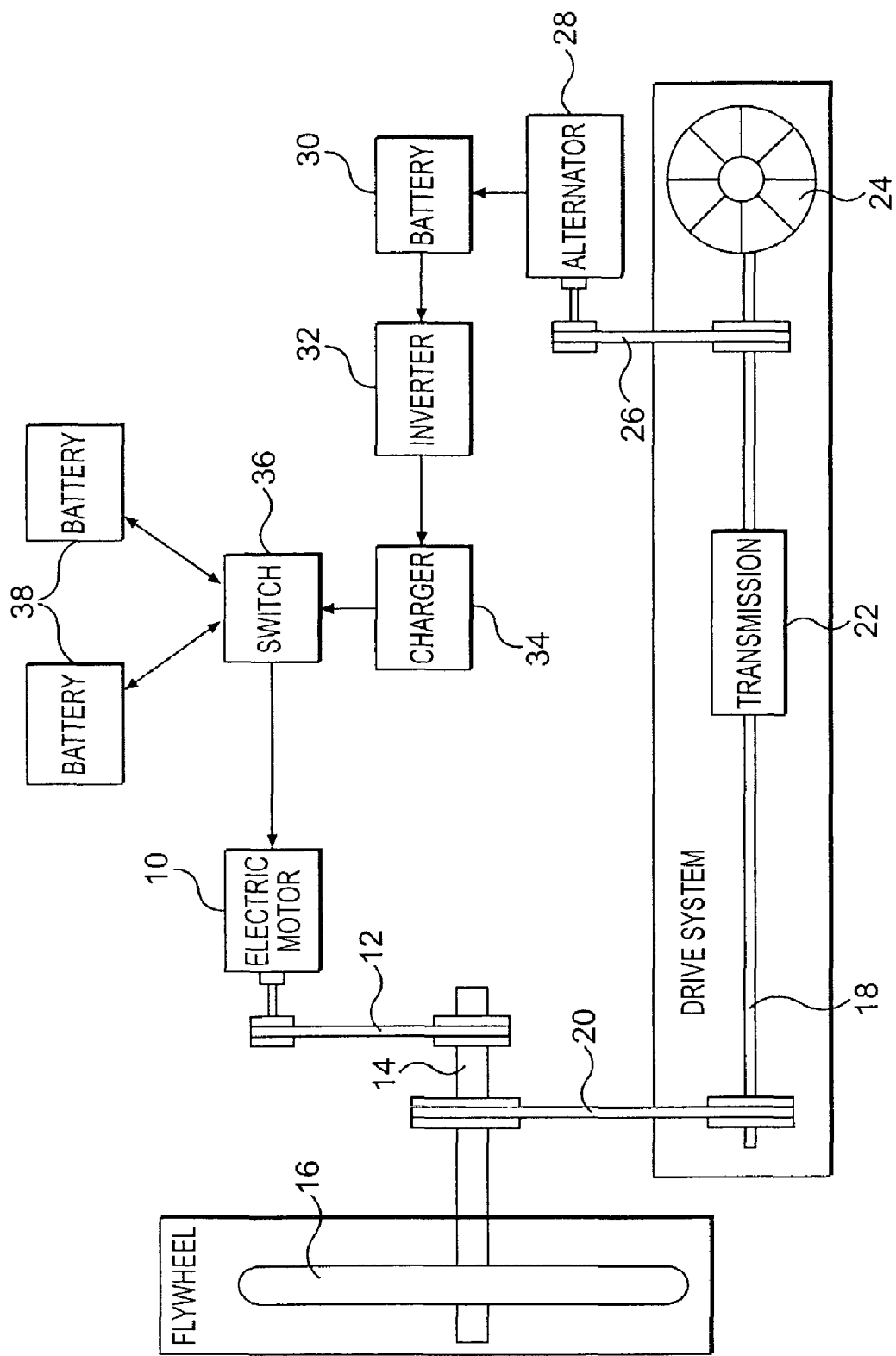
FIG. 1 is a schematic, flow chart diagram of a system in accordance with the present invention.

Turning first to the conceptual, block diagram of operation of the present invention as shown in FIG. 1, the vehicle is "started" by a user who turns on the electric motor 10, i.e., connects the motor to a battery 38. The electric motor 10 is linked by a chain 12 to the shaft 14 that carries the flywheel 16. Accordingly, the electric motor 10 causes rotation of the flywheel 16. Once the flywheel 16 reaches a predetermined number of rpms, the vehicle operator may then engage the drive shaft 18 through the transmission 22 to turn the wheels 24 through use of a variable v-belt drive or other type of linkage 20. The movement of the vehicle that results therefrom causes rotation of the drive shaft 18 which also is used to turn the alternator 28. The alternator 28 provides electric current to the charger battery 30. Current from the charger battery 30 then passes through an inverter 32 to convert the electric flow from DC to AC to thereby actuate the cell charger 34 that is connected to and recharges the battery(s) 38 that are not in electrical connection with the electric motor at that time. As shown, a switch 36 may be used to transfer the power to the electric motor 10 from one battery or set of batteries to another simultaneously with the transfer over of the charger flow from a first battery 38 to a second battery.

Figure 2:
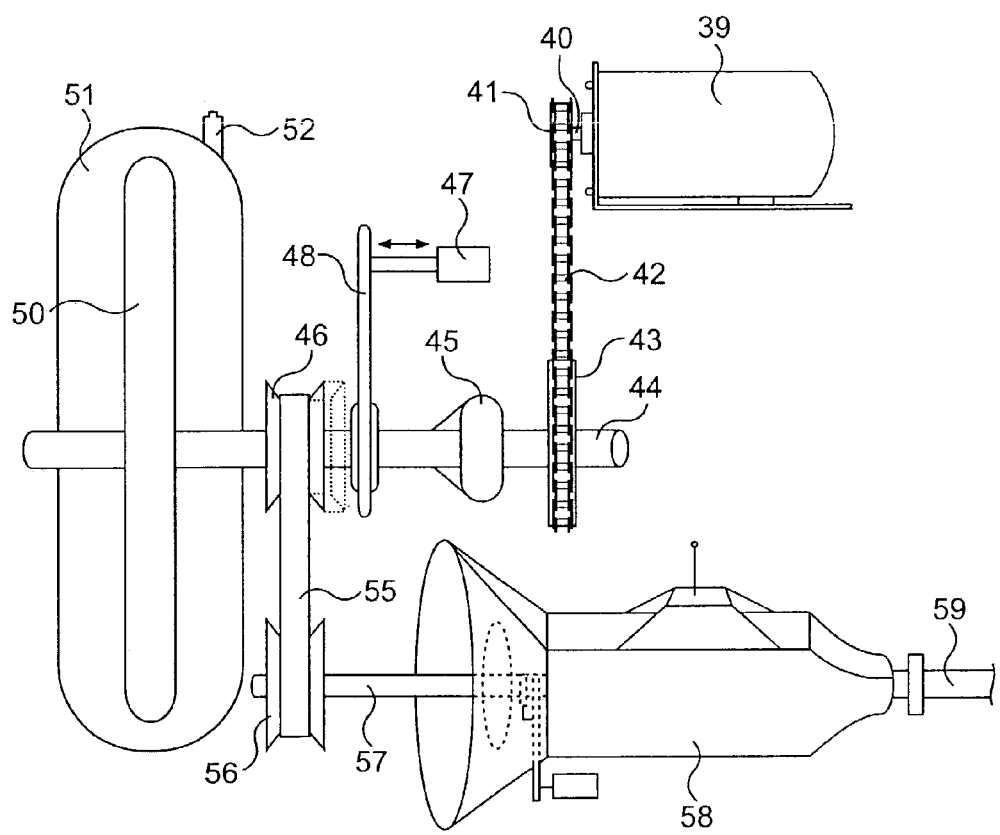
FIG. 2 is a schematic diagram of the drive system portion of a system in accordance with the present invention.
Figure 3:
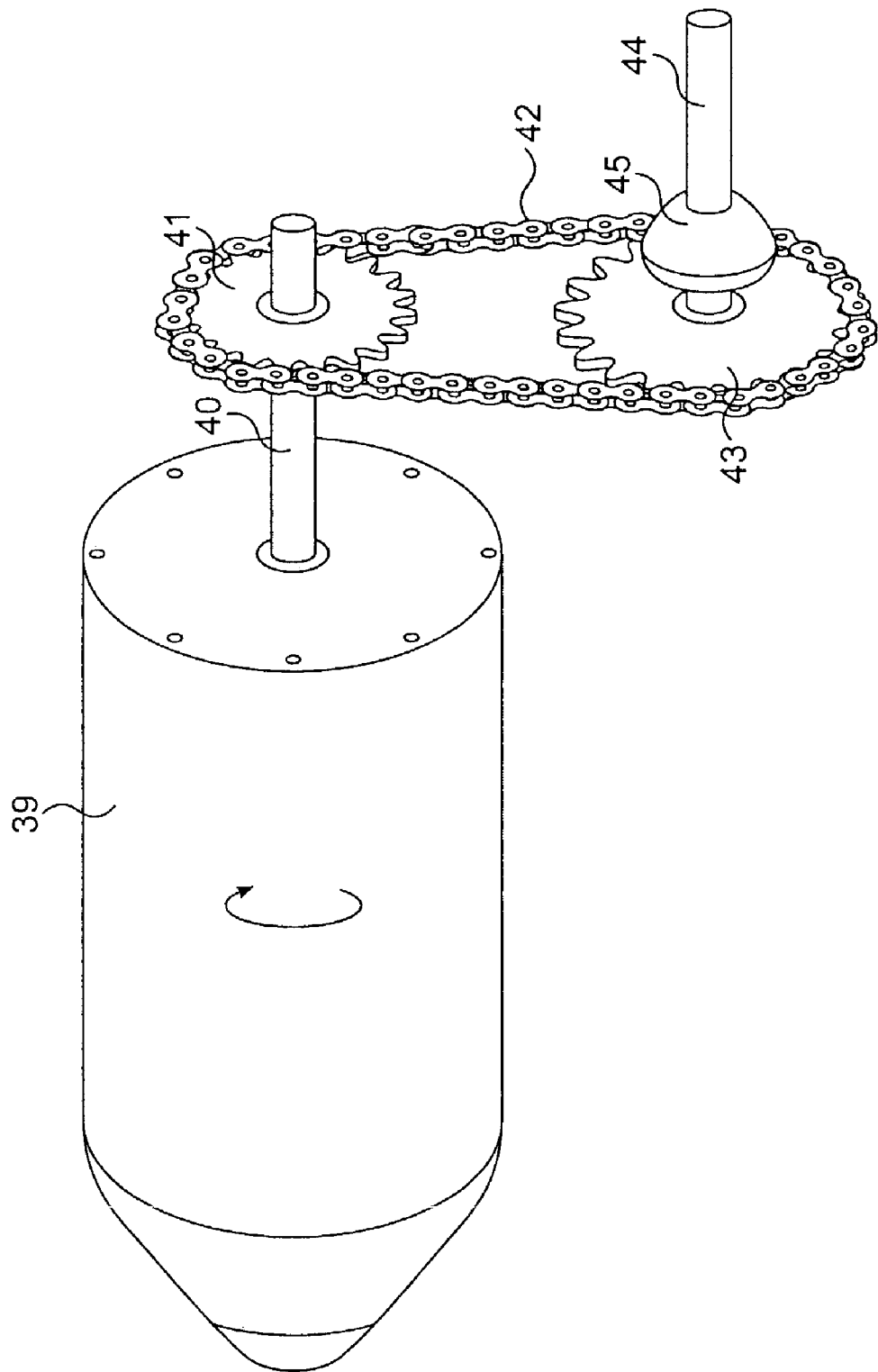
FIG. 3 is a view of the electric motor in connection with the flywheel shaft.

Turning now to FIG. 2, there is shown a side view of the mechanical drive system of the vehicle. The electric motor drive shaft 40 has a sprocket 41 mounted onto it. In a preferred embodiment, the electric motor 39 is a 36/48 volt DC GE electric motor. This motor 39 is rated for 20–50 horsepower. It is capable of 7200 rpms empty, which means no load, when drawing 18 amps. The sprocket 41 is adapted to receive a chain 42. The chain 42 is likewise adapted to be received in a flywheel shaft sprocket 43 shown mounted underneath the electric motor 39.

The electric motor 39 could be directly linked to the flywheel shaft 44, but this configuration could reduce the efficiency of the overall system. In a preferred embodiment, the electric motor sprocket 41 has a diameter of approximately 6.5 inches and has 38 teeth in it. The flywheel shaft sprocket 43 is approximately 8 inches in diameter and has 40 teeth. In this way, the electric motor 39 is efficient in rotation of the flywheel 50. In other words; the flywheel 50 does not need to operate on as many rpms as the electric motor 39. By varying the sprockets 41 and 43, and specifically the diameter of the sprockets and number of teeth on the electric motor shaft 40 and the flywheel shaft 44, the efficiencies of rotation of the electric motor 39 and the flywheel 50 can be maximized.

The sprocket 43 on the flywheel shaft 44 is mounted on a one-way clutch bearing 45 mounted on that flywheel shaft. In this way, if the flywheel 50 begins to rotate at a higher rpm than the electric motor 39 is turning the shaft 44, then the flywheel is not allowed to damage the electric motor.

To run and control the DC motor 39 described, a coil, a controller, and a potentiometer are used. These components (not shown) are capable of a minimal rating of a 36 volt DC and a maximum of 54 volt DC motor. The maximum allowed voltage is the preferred voltage in connection with an operational prototype of the present invention.

The flywheel 50 is mounted on the flywheel shaft 44 and is placed inside a vacuum chamber 51. In one example, the flywheel 50 itself is 36 inches in diameter, consisting of four layers of ¼ inch steel, thereby making it one-inch thick. The center hub which connects the flywheel 50 to the shaft 44 has a 1¾ aperture to receive the shaft. The flywheel 50 is centered between and supported by two block bearings which are also mounted inside the vacuum chamber 51. The vacuum chamber 51 is evacuated of gas through valve 52 using a conventional 12 volt vacuum pump that may be applied manually before use or as necessary. A vacuum pump may also be turned on continuously.

The weight of the flywheel 50 in this preferred embodiment is approximately 288 lbs. The combined weight of the flywheel, shaft and hub is approximately 330 lbs. The weight of the flywheel 50 is directly proportional to the size/weight of the vehicle to be put in motion. The present system is mounted on a frame that was taken from a commercial Chevrolet S-10 pickup truck. It has been found that the weight of the flywheel 50 should be no less than about 5% of the gross weight of the vehicle, and no more than about 10% of the gross weight of the vehicle in order to be efficient. The flywheel 50 should be arranged vertically above the transmission or drive system (drive shaft). This allows the center shaft 44 of the flywheel to be parallel to the input shaft 57 of the transmission 58. This allows for the efficient centering of the weight of the vehicle.

Figure 4:
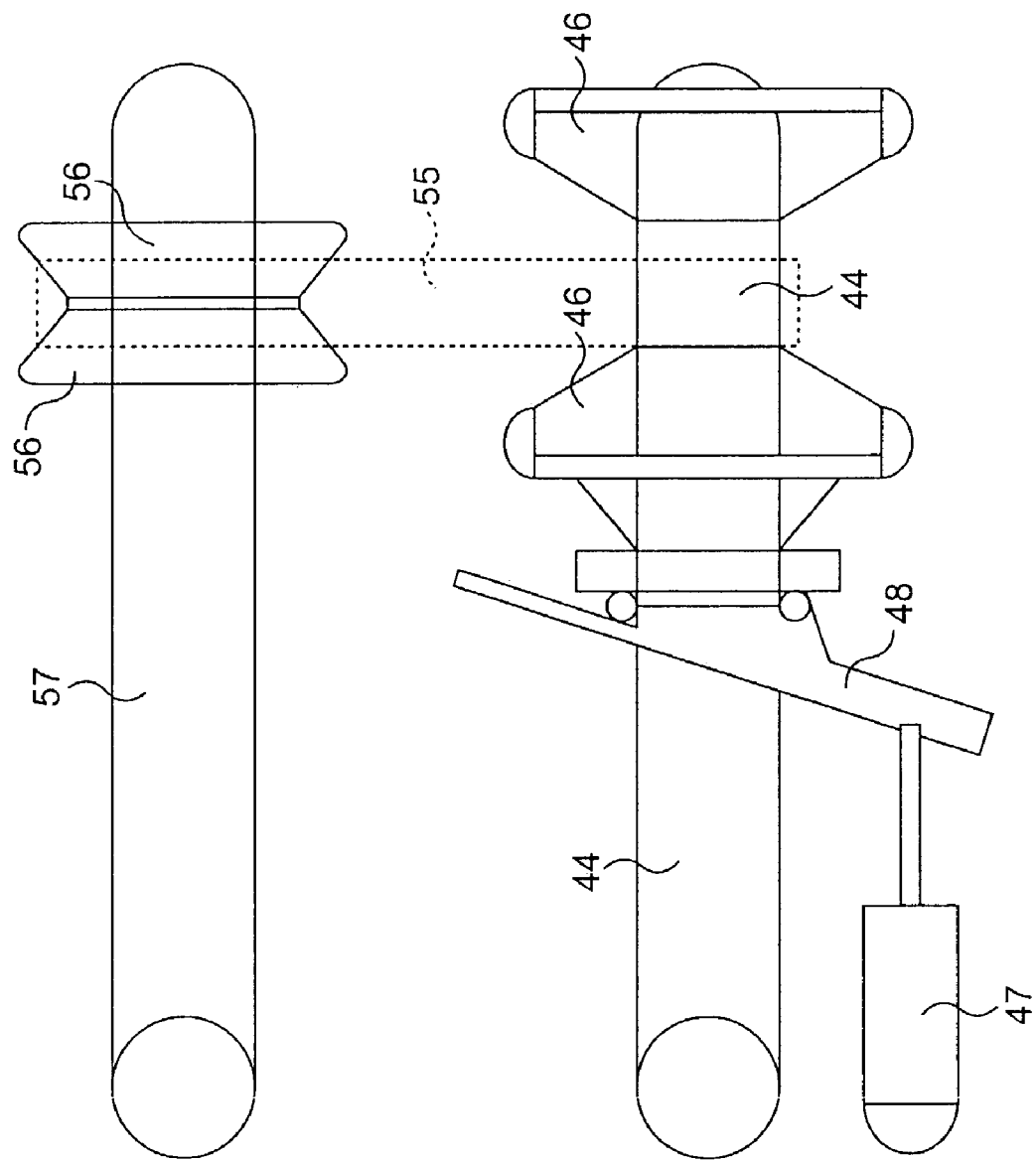
FIG. 4 is a view of the flywheel shaft and drive shaft and their interconnection.

The flywheel shaft 44 and the drive system are connected by a belt 55. The belt 55 is engaged through the operation of a hydraulically-moved pair of variable-speed sheaves 46. This allows for smooth acceleration of the vehicle. The operation of the belt 55 in the sheaves 46 acts as an accelerator pedal would-react in an ordinary, internal combustion engine vehicle. In a preferred embodiment, the sheaves 56 mounted onto the input shaft 57 component of the drive system are a spring-loaded sheaves. The sheaves 46 mounted on the flywheel shaft 44 are actuated by use of a slave cylinder 47 and throw-out bearing fork 48 that bring the two sides of the sheaves together or apart at the action of the vehicle operator. The specific structure of the sheaves 46 and 56 and their operation is shown in more detail in FIG. 4. As seen, the hydraulic slave cylinder 47 is actuated by the vehicle operator. That cylinder 47 moves a throw-out bearing fork 48 which moves the throw-out bearing so that the two sides of the variable sheaves 46 move together or apart. As recognized by those of skill in the art, when the sheaves 46 are fully apart, the belt 55 rests within the sheaves but does not move with the rotation of either shaft 44 or 57. It is only when the sheaves 46 are moved together that the belt 55 is engaged that the drive system begins to rotate.

The input shaft 57 of the drive system leads to a transmission 58. This transmission 58 may be a conventional transmission already used in connection with internal combustion engines today. Alternatively, a new transmission could be engineered to maximize the efficiencies of this flywheel-driven vehicle. In a preferred embodiment, the transmission used is simply a Chevrolet S-10, 4-speed type of transmission. The output shaft 59 on the back end of the transmission 58 is connected in a conventional manner by way of universal joints to a rear end assembly.

Figure 5:
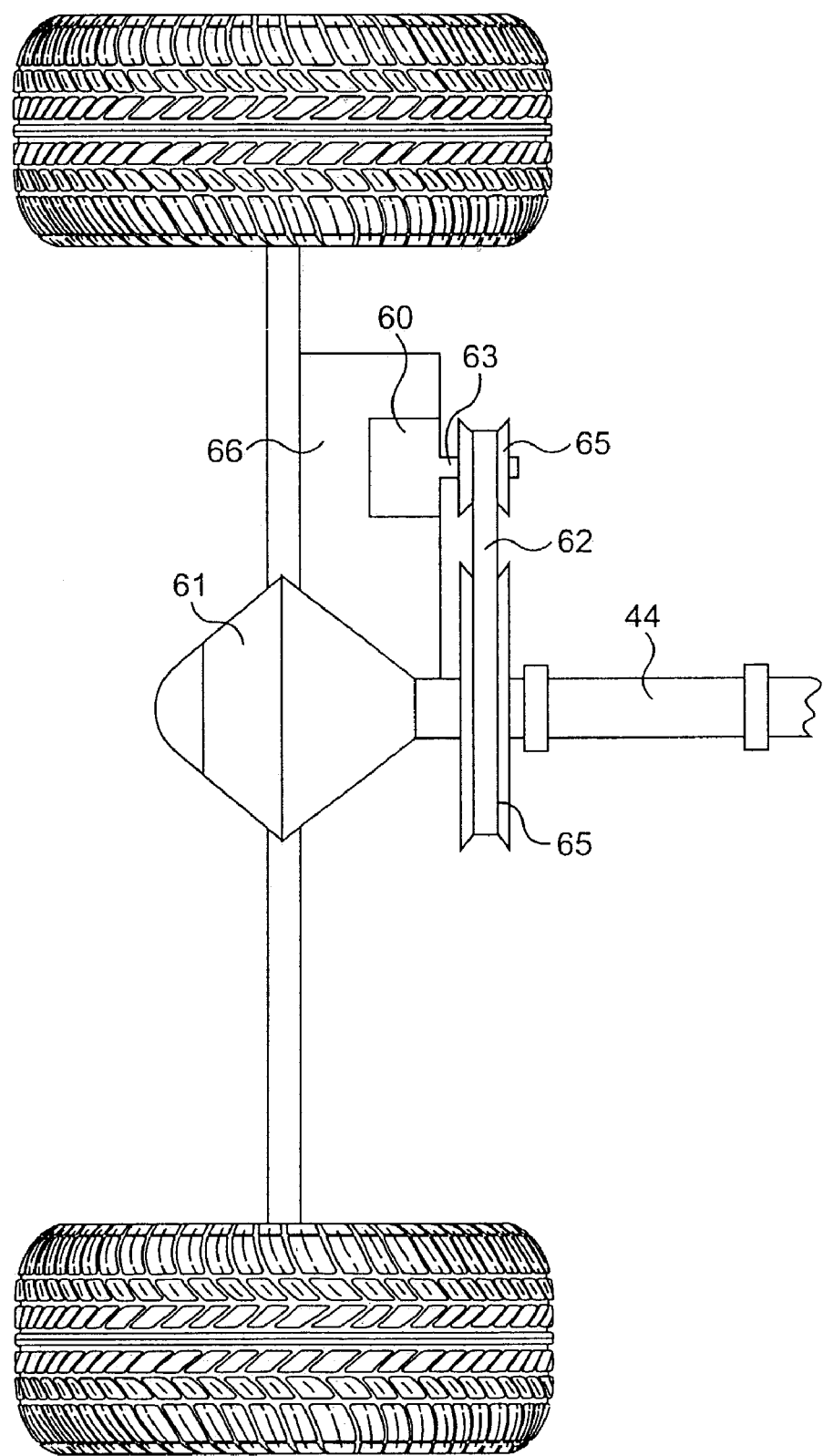
FIG. 5 is a top view of the connection of an alternator to the drive shaft at the rear of a vehicle.

As shown in FIG. 5 an alternator 60 is also mounted on the rear end 61 of the portion of the vehicle. The alternator 60 has a belt 62 that turns as a result of the pulleys 65 mounted on the alternator shaft 63 and on the drive shaft 44—specifically the spindle of the rear end 61 of the vehicle. This way, the movement of the vehicle causes the rotation of the portion of the shaft that turns the alternator 60. The alternator 60 is a 12 volt AC Delco type of alternator. It is mounted on a modified platform 66 on the rear axle and is operated by the drive belt which gets it power from a 10 inch pulley modified and fixed to the front flange of the rear axle pinion.

Referring again to FIG. 1, in an operational embodiment of the invention, the alternator 28 is electrically connected to and provides charge to two six volt batteries 30 having 290-minute capability. The alternator 28 is a 140-amp alternator that, in addition to charging the 12 volt battery system 30, supports the inverter 32 and the rest of the vehicle's electrical needs such as light.

A primary purpose of the 12 volt battery system 30 is to energize a charger 34 that is used to recharge the larger battery system that is used to drive the electric motor. In order to power the charger 34, an inverter 32 is used. The inverter 32 changes the 12 volt DC power to 110 volt AC power. The inverter 32 is capable of handling 2750 watts and peaks at 4500 watts. The inverter is manufactured by Whistler.

The charger 34 used in the construction of the preferred embodiment is a cell-type charger. It does not operate on charging specific voltage like a conventional charger. Instead, it calculates the number of cells in a battery and their specific voltage needs. The preferred charger model has a range of capabilities up to 100% of 20-amp charge. It operates on 110 volt AC volts using 17 amps under full capacity. One type of acceptable charger 34 is manufactured by EZ Red Company/Kenco. This charger 34 is capable of charging 72 cells at one time regardless of voltage. One set of batteries on the prototype contains 27 cells, so the charger is comfortably operating at only 37.5% of its capability.

The drive batteries 38 power the electric motor 10. These batteries 38 are constantly refreshed and recharged by the charger 34. In the working prototype, the drive batteries 38 are actually six, 8-volt batteries and one, 6-volt battery electrically connected together in series. There are two sets of drive batteries 38, therefore, and each set carries 54 volts. These batteries 38 are mounted on the vehicle in two separate groups and are wired to run the DC motor 10. This means that no power out of these drive batteries 38 is used for anything other than the electric motor 10.

The other 12 volt battery system 30 described earlier provides all other on-board requirements including lights, radio, etc. Because the drive batteries 38 constitute a significant weight, they are preferably mounted so that they are equally spaced with respect to the drive axis and within the boundaries of the chassis.

Each of the sets of batteries 38 is wired to a switch 36. In operation, the switch 36 will direct the flow of electric current from one bank of batteries 38 to the electric motor 10 while at the same time directing the flow of current from the charger 34 to the bank of batteries that is not being used to drive the motor. This switch 36 maintains the continued running of the motor without interruption. Further, the switch 36 allows the cross over of duty for the sets of batteries 38 in an instantaneous, in-sync operation.

Of course, other types of switches may be used than a simple timer. A voltmeter may be attached to the switch to read the voltage coming from each set of batteries. When the set of batteries that is running the electric motor reaches a predetermined voltage level, it may automatically cut the power to the electric motor over from one to the other set of drive batteries. In this way, none of the drive batteries can be overworked before being recharged. Also, while two sets of batteries have been used in the operational prototype, it is envisioned that further batteries or sets of batteries could be used if desired in order to have a redundant backup.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. A vehicle having a flywheel drive system comprising:
    a flywheel that is connected to a vehicle drive system and that provides energy to drive the vehicle;
    an electric motor that is connected to and that causes the rotation of the flywheel;
    a charger assembly;
    two drive batteries, each electrically connectable to the electric motor and the charger assembly;
    wherein when one of the drive batteries is electrically connected to the electric motor, the other drive battery is electrically connected to the charger assembly;
    wherein the charger assembly comprises a charger, an inverter, a charger battery, and an alternator, further wherein the alternator is connected to the vehicle drive system; and
    further wherein the alternator is electrically connected to and energizes the charger battery when the vehicle is in motion, the charger battery is electrically connected to and powers the inverter, the inverter is electrically connected to and powers the charger, and the charger is electrically connected to and recharges the drive battery that is not connected to the electric motor.

2. A vehicle as described in claim 1, further comprising a switch electrically connected to the electric motor, the charger assembly, and the two drive batteries;
    wherein the switch is adapted change electrical connection from a first state where first drive battery and electric motor are connected, and second drive battery and charger assembly are connected to a second state where first drive battery and charger assembly are connected, and second drive battery and electric motor are connected.

3. A vehicle as described in claim 2, where in the switch is a manual switch.

4. A vehicle as described in claim 2, where in the switch comprises a voltmeter, and wherein the switch automatically changes electrical connections based upon predetermined voltmeter readings.

5. A vehicle as described in claim 1, wherein each drive battery is set of a plurality of batteries connected together in series.

6. A vehicle as described in claim 1, wherein the weight of the flywheel is in the range of about five percent to about ten percent of the weight of the vehicle.

7. A vehicle as described in claim 1, wherein the charger is a cell-type charger.

8. A vehicle as described in claim 1, wherein the flywheel is connected to the vehicle drive system through a set of variable speed sheaves.

* * * * *